United States Patent [19]
Eda et al.

[11] Patent Number: 5,365,344
[45] Date of Patent: Nov. 15, 1994

[54] SYSTEM FOR TRANSMITTING DATA USING WAVELENGTH DIVISION MULTIPLEXING

[75] Inventors: Masahiro Eda; Masahiko Fujiwara, both of Tokyo, Japan

[73] Assignee: NEC Corporation, Tokyo, Japan

[21] Appl. No.: 904,512

[22] Filed: Jun. 25, 1992

[30] Foreign Application Priority Data

Jun. 27, 1991 [JP] Japan .................. 3-183322
Jun. 27, 1991 [JP] Japan .................. 3-183323

[51] Int. Cl.$^5$ .......................................... H04J 14/02
[52] U.S. Cl. ..................................... 359/124; 359/165
[58] Field of Search .................. 359/123, 124–125, 359/137, 165, 158, 173, 118; 370/50

[56] References Cited

U.S. PATENT DOCUMENTS

| | | | |
|---|---|---|---|
| 4,467,468 | 8/1984 | Miller | 359/123 |
| 5,005,166 | 4/1991 | Suzuki et al. | 359/123 |
| 5,077,727 | 12/1991 | Suzuki | 359/123 |
| 5,208,691 | 5/1993 | Nishio | 359/123 |

FOREIGN PATENT DOCUMENTS 0193376 9/1986 European Pat. Off. .

OTHER PUBLICATIONS

IEEE Communications Magazine, vol. 26, No. 11, Nov. 1988.

*Primary Examiner*—Richard E. Chilcot, Jr.
*Assistant Examiner*—K. Negash
*Attorney, Agent, or Firm*—Sughrue, Mion, Zinn, Macpeak & Seas

[57] ABSTRACT

A plurality of node apparatuses are connected by an optical transmission line. Each of the node apparatuses is assigned with a wavelength as an address different from the others. Therefore, when a first node apparatus transmits data to a second node apparatus, the data is of a wavelength corresponding to the address of the second node apparatus. The data transmission is carried out in a time slot defined by a frame pulse. The data of the corresponding wavelength is only received in the second node apparatus, and data of other wavelengths are passed through the second node apparatus. Consequently, media-access control is easily carried out independently in each node apparatus in an optical network system by using wavelength division multiplexing.

11 Claims, 11 Drawing Sheets

SYSTEM FOR TRANSMITTING DATA USING WAVELENGTH DIVISION MULTIPLEXING

FIELD OF THE INVENTION

The invention relates to a system for transmission of data in an optical network system by wavelength division multiplexing.

BACKGROUND OF THE INVENTION

A conventional system for switching optical signals in wavelength division multiplexing has been described on pages 1500 to 1510 of "IEEE Journal on Selected Areas in Communication, Vol. 6, No. 9". This conventional switching system can be applied to a data transmission system in an optical network system by using wavelength division multiplexing disclosed therein.

Such a data transmission system (defined "a first conventional system" hereinafter) may be realized by comprising transmitters on a transmitting side each having a tunable wavelength electric to optical converter, an optical star coupler for combining light signals of different wavelengths transmitted from the transmitters, receives on a receiving side each receiving an optical signal of a fixed wavelength, transmitters on the receiving side each transmitting a state of a corresponding receiver among the receivers on the receiving side, an optical star coupler for combining optical signals transmitted from the transmitters on the receiving side, and receivers on the transmitting side each having a tunable wavelength filter.

In operation, a transmission wavelength of a tunable wavelength filter of one transmitting side receiver is set to be a wavelength of one receiving side transmitter corresponding to one of the receiving side receivers. Then, it is confirmed that the receiving side receiver has not been receiving any optical signal from other transmitting side transmitters, and, if not, a wavelength of a tunable wavelength electric to optical converter of one transmitting side transmitter is set to be a wavelength of a fixed wavelength filter of the receiving side receiver, so that optical communication starts between the transmitting side transmitter and the receiving side receiver.

Another conventional system for switching light signals using wavelength division multiplexing has been described on pages 7 to 13 of "Proceedings of International Switching Symposium", Vol. III". This conventional switching system using wavelength division multiplexing can also be applied to a data transmission system in an optical network system disclosed therein.

Such a data transmission system (defined "a second conventional system" hereinafter) may be realized by comprising transmitters each having a fixed wavelength electric to optical converter, an optical star coupler for combining optical signals transmitted from the transmitters, receivers each having a tunable wavelength filter, and a token ring for setting wavelengths of the tunable wavelength filters of the receivers.

This network has two control phases during a transmission cycle. In the first control phase, the transmitter side ports write information to the tokens indicating to which receiver ports their data are to be sent. The receiver ports read the tokens, and tune their receivers to the appropriate transmitter port wavelength during the second phase.

Then, optical signals transmitted from the transmitters are combined in the optical star coupler, and each or some of the light signals multiplexed in the optical star coupler are received in the receivers by setting the tunable wavelengths of the tunable wavelength filters to correspond with the appropriate transmitted wavelength.

However, the first conventional data transmission system has a disadvantage in that an optical star network system using an optical star coupler, by which the receiving side receivers are checked as to whether they receive light signals from the other transmitting side transmitters or not, must be provided because of the adoption of media-access control.

Further, the second conventional data transmission system has also a disadvantage in that a token ring system, by which wavelengths of the tunable wavelength filters of the receivers are set to be corresponding wavelengths, must be provided because of the adoption of media-access control.

SUMMARY OF THE INVENTION

Accordingly, it is an object of the invention to provide a system for transmitting data using wavelength division multiplexing in which media-access control is easily carried out independently in each node apparatus.

According to the invention, a system for transmitting data using wavelength division multiplexing, comprises:

an optical transmission line through which wavelength division multiplexed data are propagated, the data being allocated in time slots defined by a frame pulse; and a plurality of node apparatuses connected to the optical transmission line for transmitting and receiving the data;

wherein each of the node apparatuses is assigned with a wavelength different from others as an address signal, so that, when it detects data of the wavelength among the wavelength division multiplexed data, it receives the data of the wavelength for data processing therein, while data of other wavelengths are passed therethrough, and, when it transmits data to one of the node apparatuses, it generates data having a wavelength assigned to the one of the node apparatuses.

According to another feature of the invention, a node apparatus used in a system for transmitting data using wavelength division multiplexing, comprises:

a first optical filter connected to the optical transmission line, and having a first output for providing a light signal of a wavelength corresponding to an address of the one of the node apparatuses and a second output for providing light signals of wavelengths corresponding to addresses of remaining node apparatuses of the node apparatuses;

a first optical to electric converter having an input connected to the first output of the first optical filter;

a first optical divider having an input connected to the second output of the first optical filter;

a second optical filter having an input connected to the first output of the first optical divider for passing the frame pulse therethrough;

a second optical to electric converter having an input connected to an output of the second optical filter;

a second optical divider having an input connected to a second output of the first optical divider;

an optical tunable wavelength filter having an input connected to a first output of the second optical divider;

a third optical to electric converter having an input connected to output of the optical tunable wavelength filter;

an optical delay line having an input connected to a second output of the second optical divider;

an optical coupler having a first input connected to an output of the optical delay line;

an electric to optical converter having an output connected to a second input of the optical coupler, an output light of a tunable wavelength being obtained at the output;

a data interface circuit having first to third inputs and first to third outputs, the first input and the first output being connected to an external data processing apparatus, the second input being connected to an output of the first optical to electric converter, and the second output being connected to an input of the electric to optical converter; and a control unit having first input and output connected to the third input and output of the data interface circuit, second and third inputs connected to outputs of the second and third optical to electric converters, and second and third outputs connected to wavelength setting inputs of the optical tunable wavelength filter and the electric to optical converter; wherein:

the first optical to electric converter provides the data interface circuit with the data received in the one of the node apparatuses to be supplied to the external data processing apparatus;

the second and third optical to electric converters provide the control unit with the frame pulse and the data of a wavelength corresponding to an address of a node apparatus among the node apparatuses to be supplied with data from the one of the node apparatuses; and the control unit controls the optical tunable wavelength filter and the electric to optical converter, so that the optical tunable wavelength filter provides the third optical to electric converter with the data of the wavelength corresponding to the address of the node apparatus, and the electric to optical converter provides the optical coupler with a light signal based on data supplied from the external data processing apparatus, the light signal having a wavelength corresponding to the address.

BRIEF DESCRIPTION OF THE DRAWINGS

The invention will be explained in more in conjunction with appended drawings; wherein.

DESCRIPTION OF THE PREFERRED EMBODIMENTS

Before explaining a system for transmitting data in wavelength division multiplexing of the preferred embodiments according to the invention, the aforementioned conventional systems for transmitting data in wavelength division multiplexing will be explained in FIGS. 1 and 2.

Figure 1:
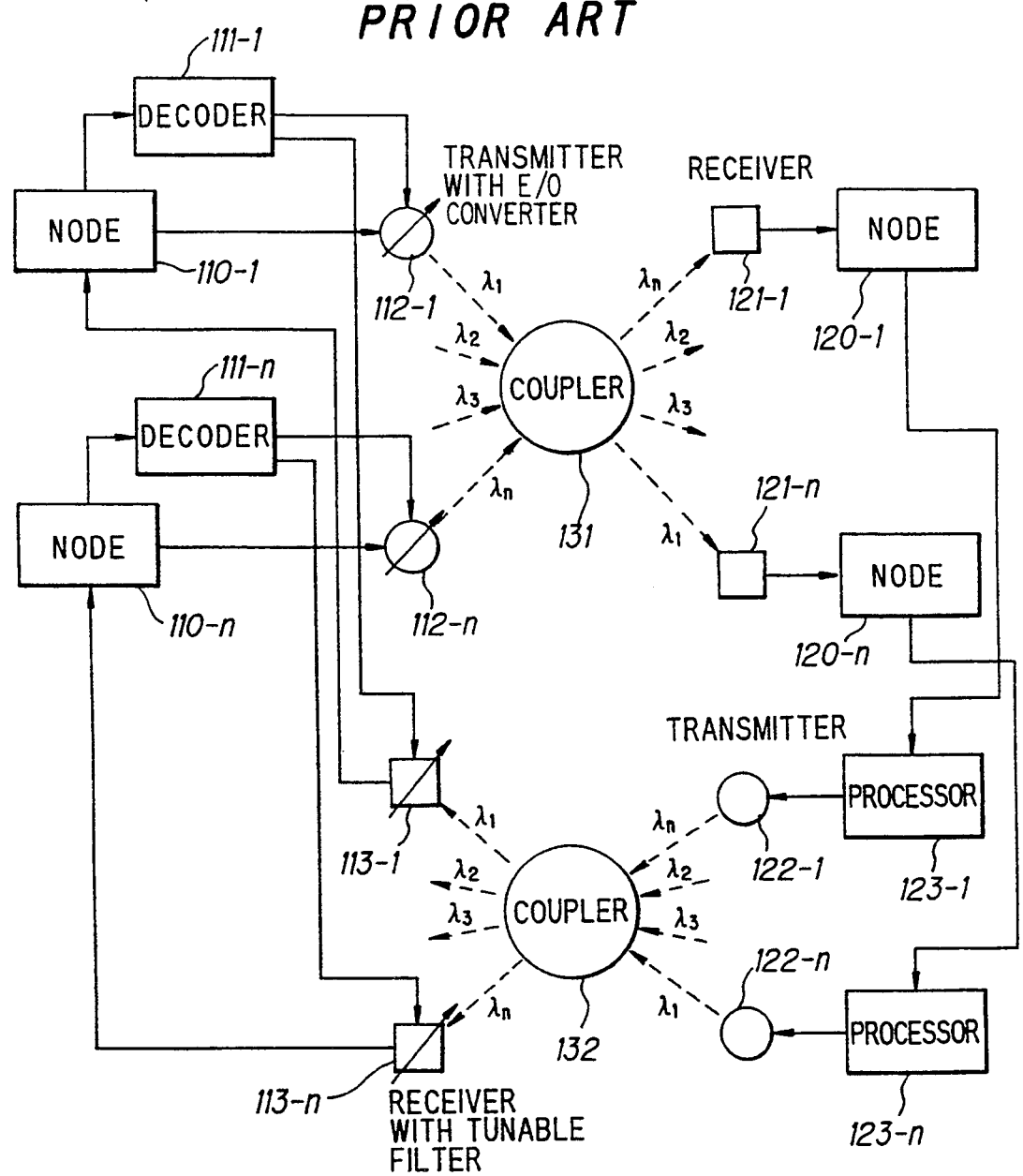
FIG. 1 is a block diagram showing the first conventional system for transmitting data using wavelength division multiplexing.

FIG. 1 shows the first conventional data transmission system which comprises node apparatuses 110-k (k=1,2, ... n) on a transmitting side, node apparatuses 120-k on a receiving side, adders decoders 111-k for decoding address signals supplied from the node apparatuses 110-k to determine wavelengths, transmitters 112-k having tunable wavelength electric to optical converters, receivers 121-k having fixed wavelength filters, transmitters 122-k having fixed wavelength electric to optical converters, processors 123-k for controlling the transmitters 122-k to transmit signals having predetermined wavelengths, receivers 113-k having tunable wavelength filters, first and second star couplers 131 and 132 for combining optical signals of wavelengths $\lambda_1, \lambda_2 ... \lambda_n$ to provide wavelength division multiplexed optical signals.

In operation, it is assumed that a light signal of a wavelength $\lambda_1$ is transmitted from the node apparatus 110-1 to the node apparatus 120-n connected to the receiver 121-n having the fixed wavelength filter of the wavelength $\lambda_1$.

First, the node 110-1 supplies an address signal to the address decoder 111-1, in which the address signal is decoded to provide a decoded signal corresponding to the wavelength $\lambda_1$, so that a wavelength of the tunable wavelength filter of the receiver 113-1 is set to be the wavelength $\lambda_1$.

Second, the receiver 121-n connected to the node apparatus 120-n is checked by the processor 123-n that it receives no signal from the transmitters 112-2 to 112-n.

Third, a wavelength of the tunable wavelength electric to optical converter of the transmitter 112-1 is set to be the wavelength $\lambda_1$, so that a optical signal of the wavelength $\lambda_1$ is transmitted from the transmitter 112-1 in accordance with the driving thereof by the node apparatus 110-1. The optical signal of the wavelength $\lambda_1$ is combined with other optical signals by the first star coupler 131, so that wavelength division multiplexed optical signals are supplied from the first star coupler 131. Thus, the receiver 121-n receives the optical signal of the wavelength $\lambda_1$ among the wavelength division multiplexed optical signals.

When the receiver 121-n detects that it receives an optical signal, the receiver 121-n checks as to whether or not it also receives an optical signal from the other transmitters 112-2 to 112-n. If so, this state is informed from the transmitter 122-n through the second star coupler 132 to the receiver 113-1, and the transmission of the optical signal of the wavelength $\lambda_1$ is suspended between the node apparatuses 110-1 and 120-n.

Figure 2:
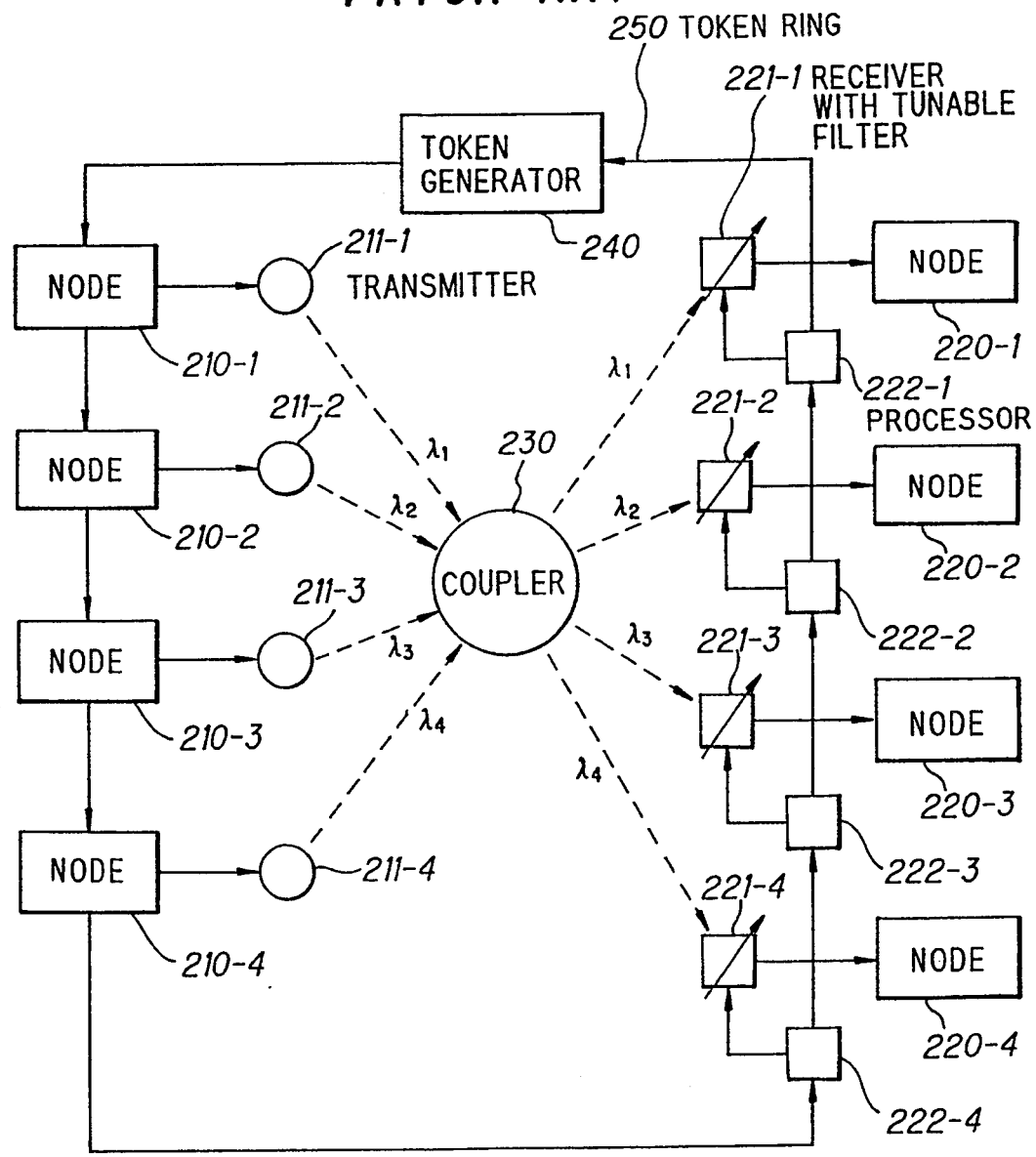
FIG. 2 is a block diagram showing the conventional system for transmitting data using wavelength division multiplexing.

FIG. 2 shows the second conventional data transmission system which comprises node apparatuses 210-1 to 210-4 on a transmitting side, node apparatuses 220-1 to 220-4 on a receiving side, transmitters 211-1 to 211-4 having fixed wavelength filters of wavelengths $\lambda_1$ to $\lambda_4$ an optical star coupler 230 for combining optical signals of the wavelengths $\lambda_1$ to $\lambda_4$ to provide wavelength division multiplexed optical signals, receivers 221-1 to 221-4 having tunable wavelength filters, processors 221-1 to 221-4 for setting wavelengths of the tunable wavelength filters of the receivers 221-1 to 221-4 to be the wavelengths $\lambda_1$ to $\lambda_4$, and a token generator 240 connected to the node apparatuses 210-1 to 210-4 and the processors 222-1 to 222-4 by a token ring 250.

In operation, it is assumed that the filter wavelengths are fixed to be $\lambda_1$ for the transmitter 210-1, $\lambda_2$ for the transmitter 210-2, $\lambda_3$ for the transmitter 210-3, and $\lambda_4$ for the transmitter 210-4, respectively, and that data transmission is carried out between the node apparatuses 210-1 and 220-1, 210-2 and 220-2, 210-3 and 220-3, and 210-4 and 220-4, respectively.

In this assumption, a token signal is generated in the token generator 240 to be transmitted through the token ring 250, so that the processors 222-1 to 222-4 control the tunable wavelength filters of the receivers 221-1 to 221-4 to be set with the tunable wavelengths $\lambda_1$ to $\lambda_4$, respectively. Thus, data transmission is carried out as shown in FIG. 2.

Next, systems for transmitting data using wavelength division multiplexing of the preferred embodiments according to the invention will be explained.

Figure 3:
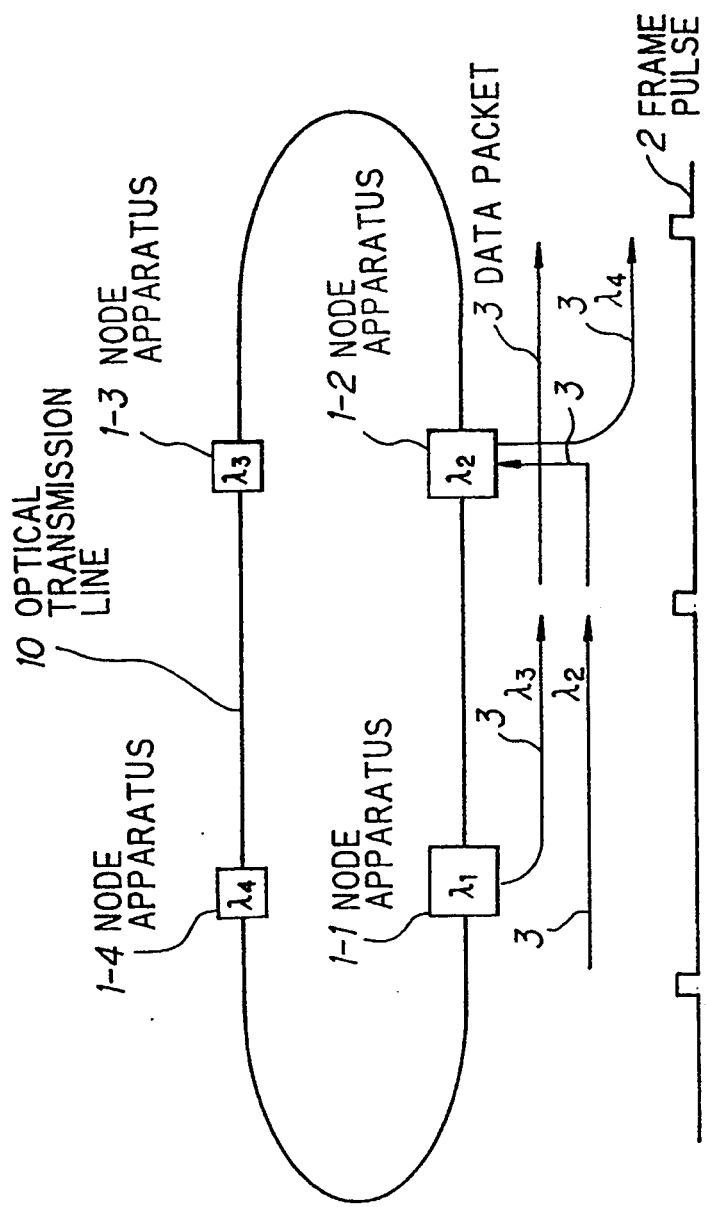
FIGS. 3 to 9 are block diagrams showing systems for transmitting data using wavelength division multiplexing of first to seventh preferred embodiments according to the invention.

FIG. 3 shows a system for transmitting data using wavelength division multiplexing of the first preferred embodiment which comprises node apparatuses 1-1, 1-2, 1-3 and 1-4 connected by an optical transmission line 10. The node apparatuses 1-1 to 1-4 are assigned with wavelengths $\lambda_1$ to $\lambda_4$ for addresses, as shown therein, and are provided with tunable wavelength electric to optical converters, each of which is tuned to be one of the wavelengths $\lambda_1$ to $\lambda_4$.

In operation, when the node apparatus 1-1 transmits data to the node apparatus 1-3, a light of wavelength $\lambda_3$ is modulated by the data, so that the light signal of the wavelength $\lambda_3$ generated in the node apparatus 1-1 is supplied to the transmission line 10 in the form of data packets 3, each of which is allocated in a time slot defined by a frame pulse 2. Thus, wavelength division multiplexed light signals are propagated through the transmission line 10. In the node apparatus 1-3, the optical signal of the wavelength $\lambda_3$ is selected to be pulled thereinto by use of the tunable wavelength filter, while the other light signals are passed through the node apparatus 1-3.

As understood from the above, the transmission of data is synchronized by the frame pulse 2, so that each of the node apparatuses 1-1 to 1-4 detects the frame pulse 2 independently to establish the synchronism of the data transmission. In addition, the node apparatus 1-1 to 1-4 are accessed by the wavelengths $\lambda_1$ to $\lambda_4$, so that it becomes unnecessary to detect an address in accordance with the reproduction of an address signal by using the optical filter. This allows an independent and easy media-access control.

Figure 4:
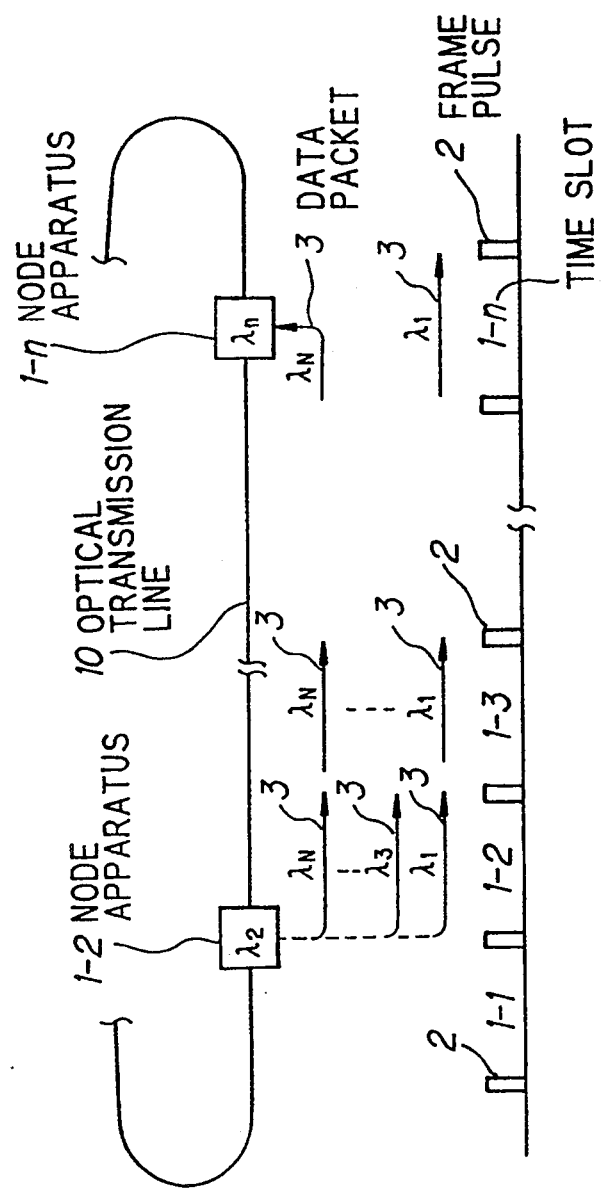

FIG. 4 shows a system for transmitting data using wavelength division multiplexing of the second preferred embodiment which comprises node apparatuses 1-1, 1-2 ... 1-n (only 1-2 and 1-n shown) connected by an optical transmission line 10. Each of the node apparatuses comprises a plurality of electric to optical converters of plural output wavelengths corresponding to addresses of the other node apparatuses.

In operation, a frame pulse 2 is generated to provide time slots 1-1, 1-2 ... 1-n assigned to the node apparatuses 1-1, 1-2 ... 1-n. For instance, in the time slot 1-2, the node apparatus 1-2 supplies data packets 3 of a wavelength $\lambda_1$ for the node apparatus 1-1, a wavelength $\lambda_3$ for the node apparatus 1-3, ... a wavelength $\lambda_n$ for the node apparatus 1-n to the optical transmission line 10. Thus, one node apparatus supplies transmission data to the transmission line 10 in one time slot, so that no collision of data transmission occurs. Therefore, media-access control is carried out in each node apparatus independently without any complicated control.

Figure 5:
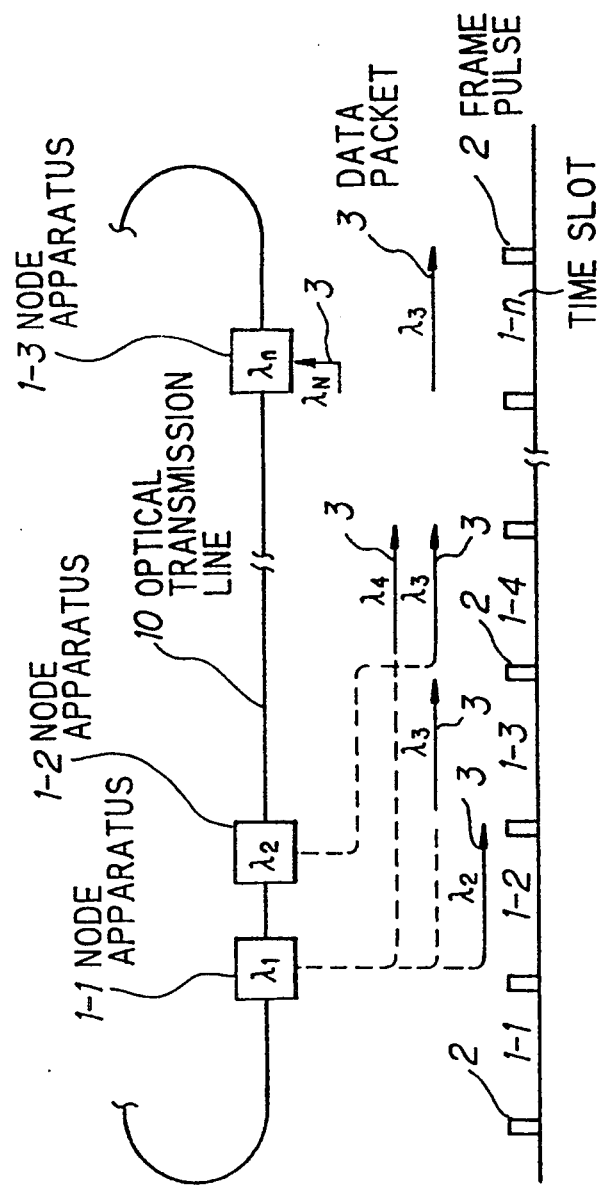

FIG. 5 shows a system for transmitting data using wavelength division multiplexing of the third preferred embodiment, wherein like parts are indicated by like reference numerals as used in the first and second preferred embodiments.

In operation, a frame pulse 2 is generated to provide time slots 1-1, 1-2 ... 1-n assigned to predetermined data transmission sequences of the node apparatuses 1-1, 1-2 ... 1-n. For instance, when the time slot 1-2 starts, the node apparatus 1-1 starts data transmission sequence, so that the node apparatus 1-1 provides data packets 3 of a wavelength $\lambda_2$ to be supplied to the node apparatus 1-2 in the time slot 1-2, of a wavelength $\lambda_3$ to be supplied to the node apparatus 1-3 in the time slot 1-3, and of a wavelength $\lambda_4$ to be supplied to the node apparatus 1-4 in the time slot 1-4. In the same manner, when the time slot 1-4 starts, the node apparatus 1-2 starts data transmission sequence, so that the node apparatus 1-2 provides data packet 3 of a wavelength $\lambda_3$ to be supplied to the node apparatus 1-3 in the time slot 1-4, during which the data transmission is in parallel carried out from the node apparatus 1-1 to the node apparatus 1-4 by using the wavelength $\lambda_4$. Thus, the same data transmissions are not carried out in one time slot, so that media-access control is easily realized in each node apparatus independently without any complicated control.

Figure 6:
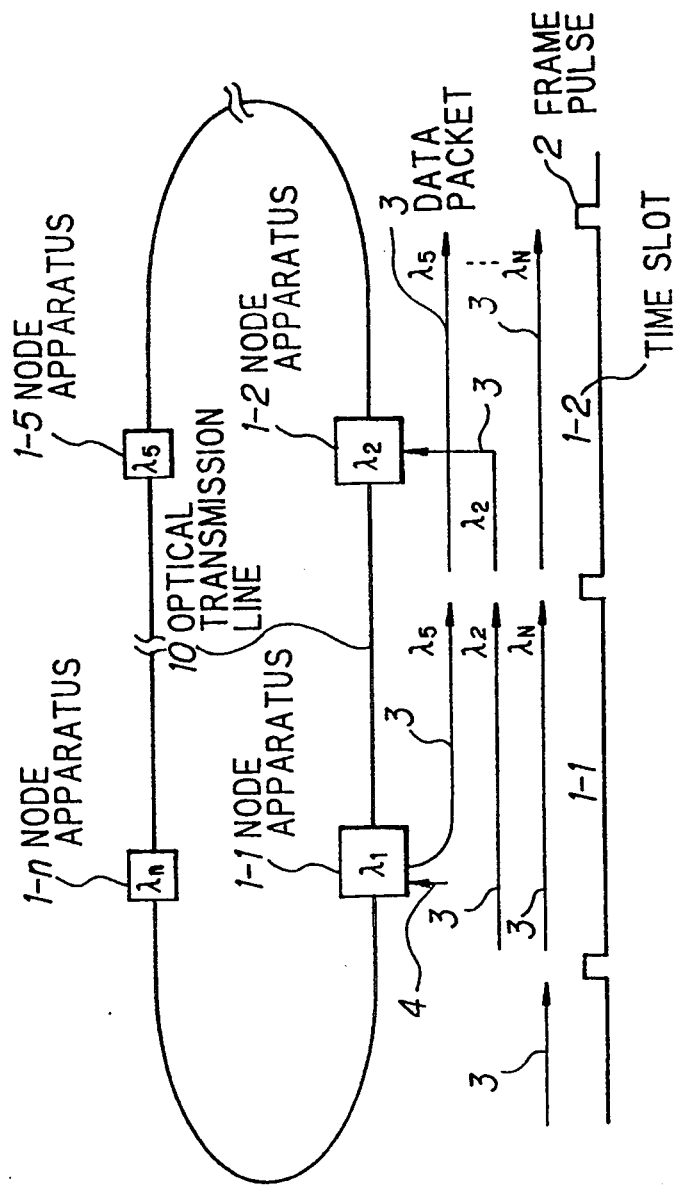

FIG. 6 shows a system for transmitting data in wavelength division multiplexing of the fourth preferred embodiment, wherein like parts are indicated by like reference numerals as used in the first to third preferred embodiments.

In operation, when the time slot 1-1 starts, the node apparatus 1-1 samples light signals transmitted through the optical transmission line 10, for instance, by using a directional coupler, as shown by the reference numeral 4. At this time, the transmitted optical signals are delayed by a predetermined delay time in consideration of the processing time of the sampled light signals. In this sampling, when no optical signal of a wavelength $\lambda_5$ is detected, the node apparatus 1-1 generates data packet 3 of the wavelength $1\lambda_5$ to be supplied on the optical transmission line 110, as shown in FIG. 6, so that the data packet 3 is propagated through the optical transmission line 10 to be received in the node having an address of the wavelength $\lambda_5$. On the other hand, if a optical signal of the wavelength $\lambda_5$ is detected in that sampling, a predetermined number of the time slots are successively checked to find no existence of data packet 3 having the wavelength $\lambda_5$. When such a time slot is detected, the above described generation of the data packet 3 of the wavelength $\lambda_5$ is carried out.

Figure 7:
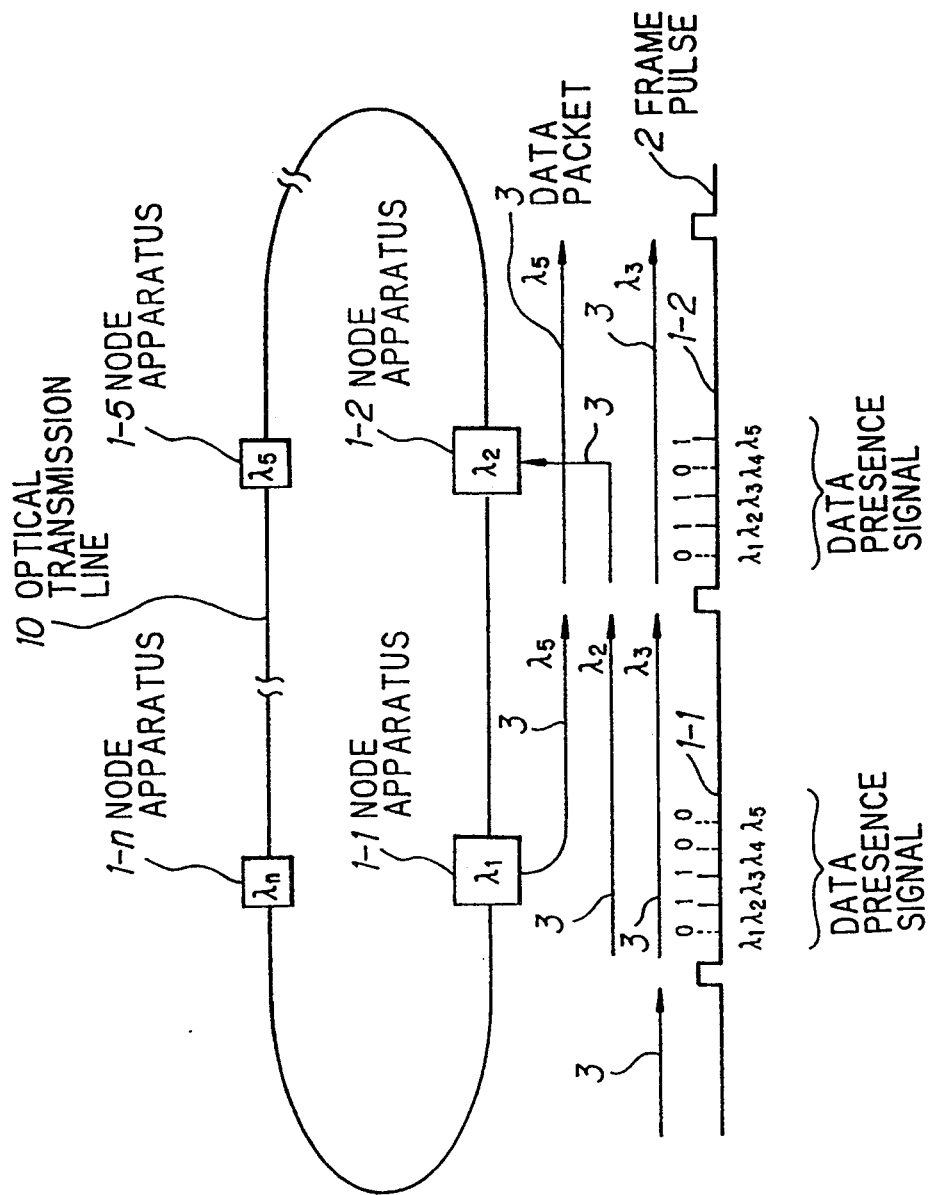

FIG. 7 shows a system for transmitting data in wavelength division multiplexing of the fifth preferred embodiment, wherein like parts are indicated by like reference numerals as used in the first to fourth preferred embodiments.

In operation, when the time slot 1-1 starts, a frame pulse 2 is checked in the node apparatus 1-1. The frame pulse 2 includes an additional digital signal, for example "0 11 00" representing that data packets 3 of wavelengths $\lambda_2$ and $\lambda_3$ exist in the time slot 1-1, but data packets 3 of wavelength $\lambda_1$, $\lambda_4$ and $\lambda_5$ are not provided therein. Consequently, no data is pulled into the node apparatus 1-1 in the time slot 1-1, but data packet 3 of the wavelength $\lambda_5$ is supplied on the optical transmission line 10. Accordingly, the signal added to the frame pulse 2 is "0 11 01" in the time slot 2, so that data packet 3 of the wavelength $\lambda_2$ is pulled into the node apparatus 1-2.

Figure 8:
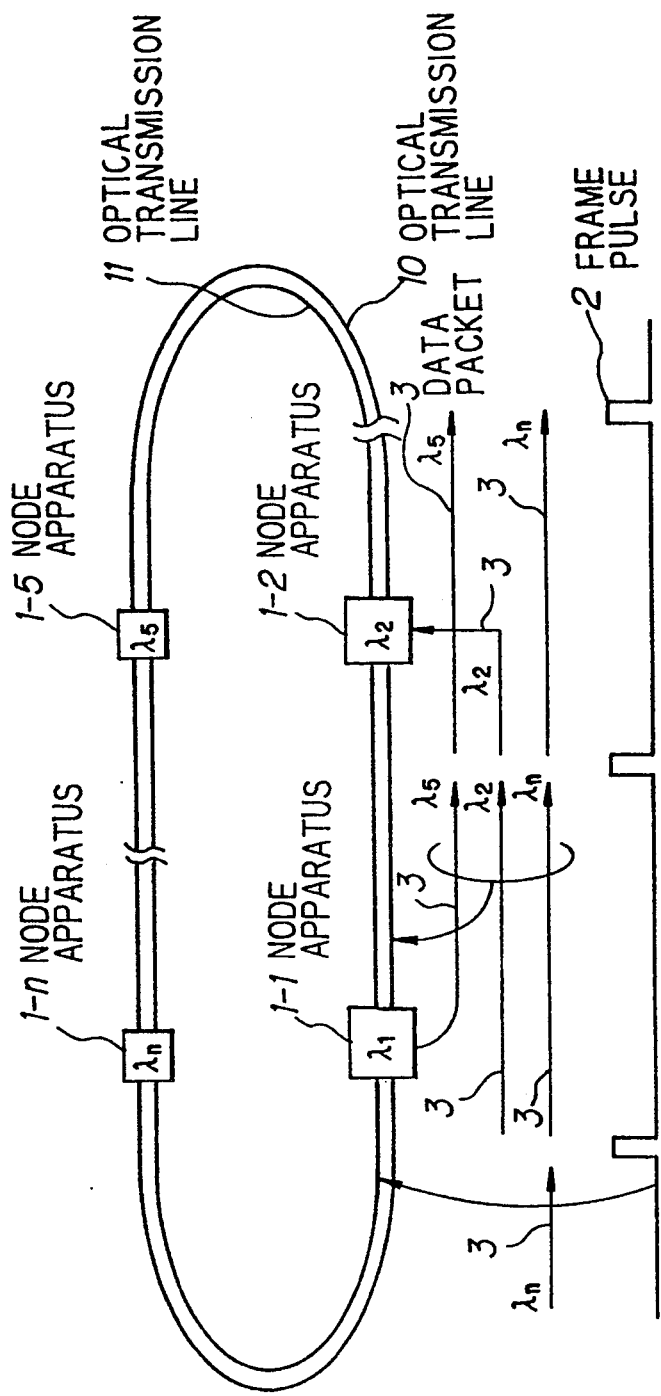

FIG. 8 shows a system for transmitting data using wavelength division multiplexing of the sixth preferred embodiment, wherein like parts are indicated like reference numerals as used in the first to fifth preferred embodiments.

In construction, however, a second optical transmission line 11 is provided to be parallel to the first optical transmission line 10, so that a frame pulse 2 is transmitted through the second optical transmission line 11, while the data packets 3 are transmitted through the first optical transmission line 10. Consequently, the detection of the frame pulse 2 becomes easy.

Figure 9:
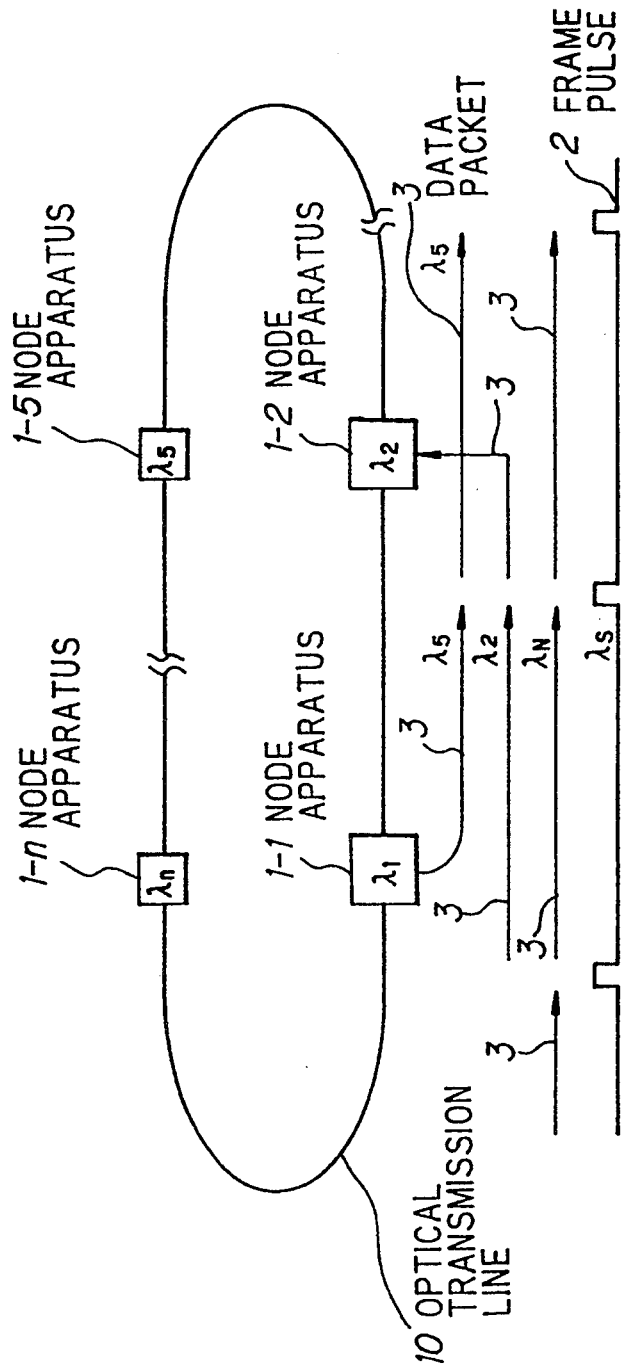

FIG. 9 shows a system for transmitting data using wavelength division multiplexing of the seventh preferred embodiment, wherein like parts are indicated by like reference numerals as used in the first to sixth preferred embodiments.

In operation, the node apparatuses 1-1 to 1-n are assigned with addresses of wavelength $\lambda_1$ to $\lambda_n$, so that data packets 3 are of the wavelengths $\lambda_1$ to $\lambda_n$. On the other hand, a frame pulse 2 is of a wavelength $\lambda_s$ which is different from the wavelength $\lambda_1$ to $\lambda_n$, so that the detection of the frame pulse 2 becomes easy.

Figure 10:
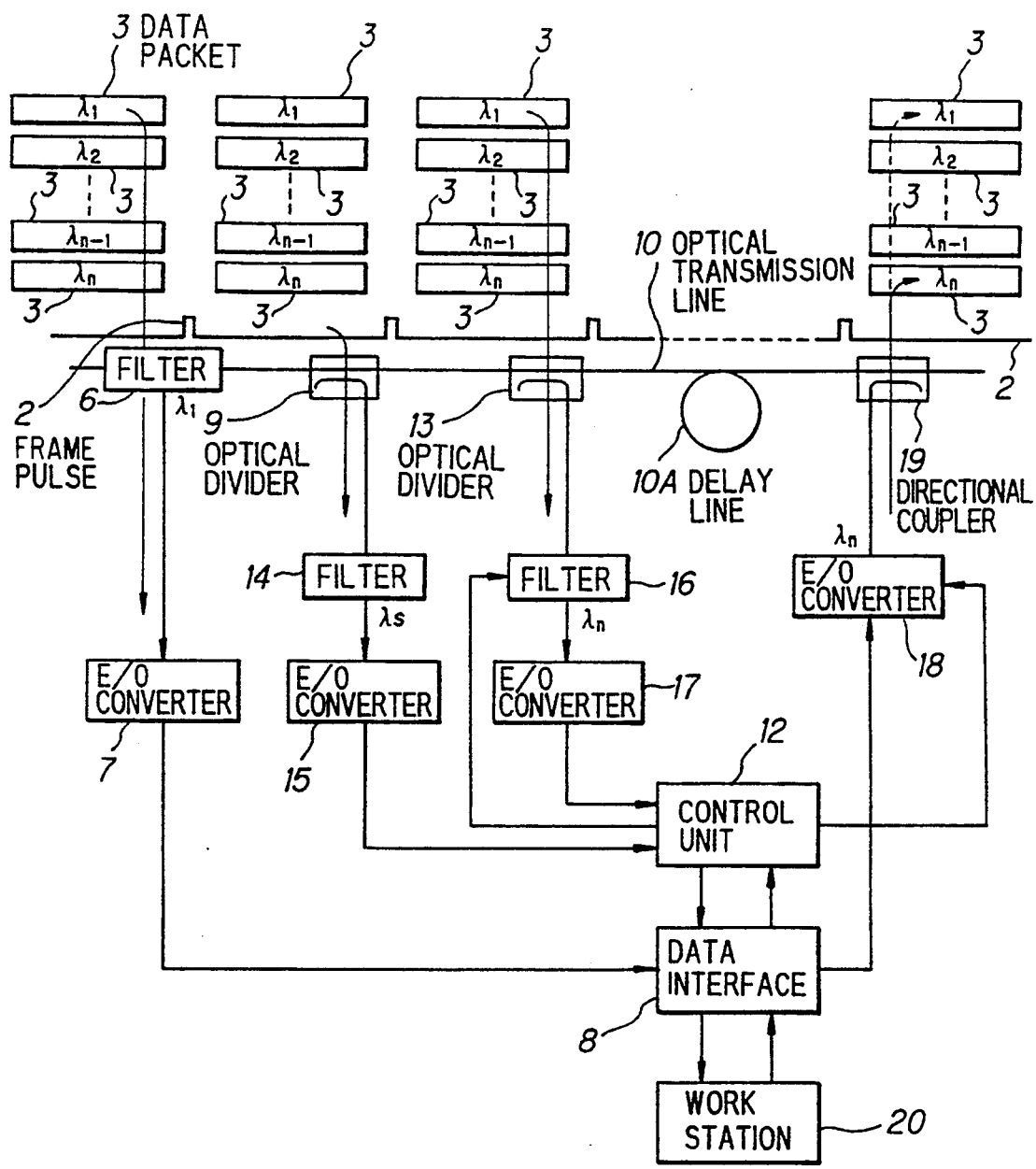
FIG. 10 is a block diagram showing a node apparatus used in the system of the preferred embodiments.

FIG. 10 shows a node apparatus which is one of the node apparatuses 1-1 to 1-n used in the systems for transmitting data using wavelength division multiplexing of the first to seventh preferred embodiments. The node apparatus comprises an optical filter 6 coupled to the optical transmission line 10 and of a fixed wavelength, for instance, the wavelength $\lambda_1$ assigned to the node apparatus 1-1, an optical to electric converter 7 for converting a light signal (data packet 3 of the wavelength $\lambda_1$) selected by the optical filter 6 to an electric signal, a data interface 8 for transfer of data in the electric signal to a work station, a computer, etc., as indicated by the reference numeral 20, an optical divider 9 for collecting data packets 3 other than the data packet 3 of the wavelength $\lambda_1$, and a frame pulse 2 from the optical transmission line 10, a fixed wavelength filter 14 for passing only the frame pulse 2, an optical to electric converter 15 for converting the optical frame pulse 2 to an electric pulse signal, an optical divider 13 for collecting the data packets 3 other than the data packet 3 of the wavelength $\lambda_1$ and the pulse frame 2 from the optical transmission line 10, a tunable wavelength filter 16 for selecting one of the data packets 3, an optical to electric converter 17 for converting the selected data packet 3 to an electric signal, a control unit 12 for processing the electric signals supplied from the optical to electric converters 15 and 17 and data supplied through the data interface 8 from the work station 20, an electric to optical converter (for instance, multi-electrode DBR laser) 18 for converting an electric signal supplied from the control unit 12 to a light signal, an optical coupler 19 for coupling the converted light signal to the optical transmission line 10, and a delay line 10A provided between the optical divider 13 and the optical coupler 19 on the optical transmission line 10.

In operation, the data packet 3 of the wavelength $\lambda_1$ for the node apparatus 1-1 is divided from the data packets 3 transmitted through the optical transmission line 10 by the fixed wavelength filter 6, and the divided data packet 3 of the wavelength $\lambda_1$ is converted to the electric data packet signal by the optical to electric converter 7. Then, the electric data packet signal is supplied to the data interface 8, in which an address is detected in the received data packet signal. The received data packet signal is re-composed therein, if necessary, and is transferred to the work station, the computer, etc., as indicated by the reference numeral 20, in accordance with the detected address.

At the same time, the data packets 3 other than the data packet 3 of the wavelength $\lambda_1$ and the frame pulse 2 are divided by the optical divider 9, and only the frame pulse 2 is passed through the fixed wavelength filter 14 to be supplied to the optical to electric converter 15, from which the converted electric frame pulse 2 is supplied to the control unit 12.

In the similar manner, the data packets 3 other than the data packet 3 of the wavelength $\lambda_1$ and the frame pulse 2 are also divided by the optical divider 13, and only one of the data packets 3 is passed through the tunable wavelength filter 16 to be supplied to the optical to electric converter 17, from which the converted electric data packet signal is supplied to the control unit 12.

Data supplied from the work station, the computer, etc. as indicated by the reference numeral 20 is transferred to the data interface 8, in which an address is detected in the data to be supplied to the control unit 12. In accordance with the detected address, a node apparatus to which the data is transmitted is determined in the control unit 12. Then, the tunable wavelength filter 16 and the electric to optical converter 18 are controlled in accordance with a wavelength of the determined node apparatus by the control unit 12, so that a pass-wavelength of the tunable wavelength filter 16 and a transmission wavelength of the electric to optical converter 18 are set to be the wavelength of the determined node apparatus. It is checked in the control unit 12 whether data packet having the tuned wavelength is found in the signal received from the optical to electric converter 17 in a time slot defined by the frame pulse 2 received from the optical to electric converter 15. When the data packet of the tuned wavelength is not detected, the data supplied through the data interface 8 from the work station, the computer, etc. 20 is supplied as a data packet to the electric to optical converter 18 in synchronism with the frame pulse 2 detected by the optical to electric converter 15. At this time, the transmitting data is re-composed in the data interface 8, if necessary. The data packet transmitted from the electric to optical converter 18 is supplied on the optical transmission line 10 by the optical coupler 19, so that it is combined with the other data packets 3 and the frame pulse 2 having a predetermined delayed time resulted by the delay line 10A. On the other hand, if the data packet of the tuned wavelength is found in the received time slot, the control unit 12 supplies this detected data packet to the electric to optical converter 18, and continues the check in which a time slot having no data packet of the tuned wavelength is detected. Then, the data packet is supplied in the time slot having no data packet of the tuned wavelength to the optical to electric converter 18.

Figure 11:
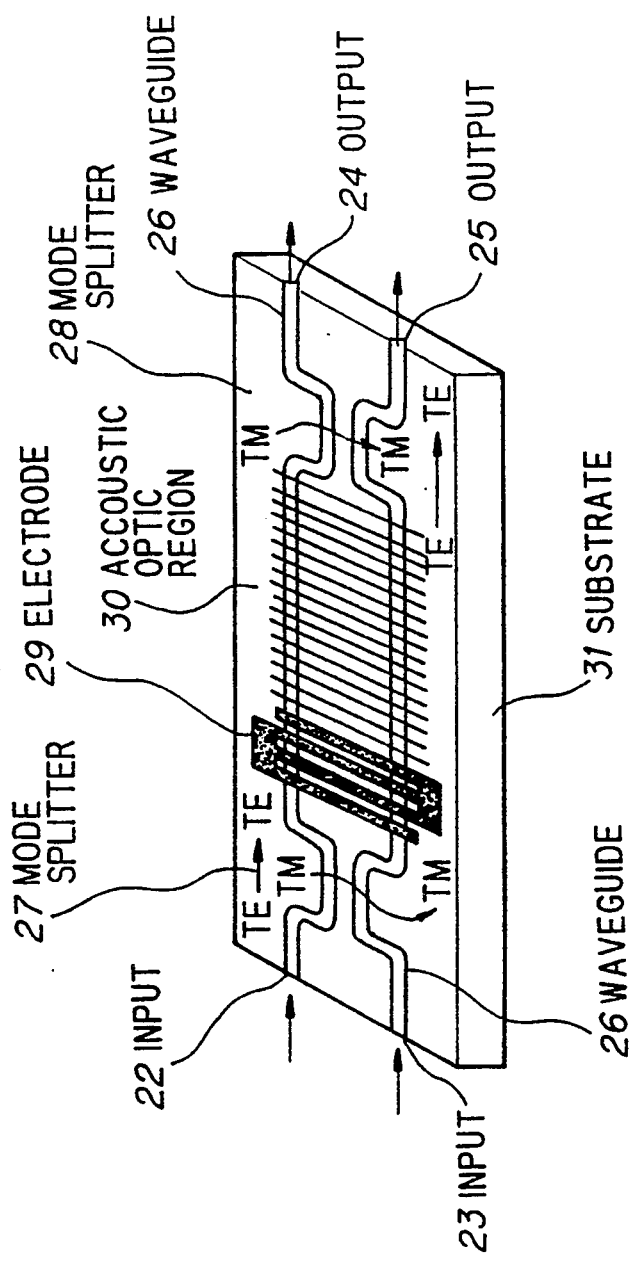
FIG. 11 is a perspective view showing a tunable wavelength optical filter utilizing acoustic optic effect used in the preferred embodiment according to the invention.

In the preferred embodiments, the optical tunable wavelength filter may be an optical tunable wavelength filter utilizing acoustic optic effect described on pages 70 to 73 of "European Conference On Optical Communication, preliminary report, Vol. 3", as shown in FIG. 11.

This optical tunable wavelength filter comprises two waveguides 26 having first and second inputs 22 and 23 and first and second outputs 24 and 25 obtained by Ti-diffusion on a lithium niobate substrate 31, first and second TE-TM splitters 27 and 28, an electrode 29, and an acoustic wave region 30.

In operation, a waveguide light supplied the first input 22 is divided into TE and TM polarizations by the first TE-TM splitter 27, so that lights are propagated through the first and second waveguides 26 to be combined by the second TE-TM splitter 28, thereby providing an output light at the first output 24. At this state, if an electric signal of a frequency is applied to the electrode 29, a waveguide light of a wavelength corresponding to the frequency is subject to TE-TM mode conversion or TM-TE mode conversion, so that only a guided optical signal of the wavelength is obtained at the second output 25, while the remaining optical signals are obtained at the first output 24. For this reason, a wavelength of an output light is changed at the second output 25 by changing a frequency of the electric signal.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A system for transmitting data using wavelength division multiplexing, comprising:
   an optical transmission line through which wavelength division multiplexed data are propagated, said data being allocated in time slots defined by a frame pulse; and
   a plurality of node apparatuses connected to said optical transmission line for transmitting and receiving said data,
   wherein each of said plurality of node apparatuses is assigned with a wavelength different from the other node apparatuses, which acts as an address signal, and each of said node apparatuses comprises:
      first detecting means for detecting one of said wavelength division multiplexed data with a wavelength corresponding to the assigned wavelength and propagated on the optical transmission line;
      means for receiving data of said one of said wavelength division multiplexed data detected by the first detecting means;
      second detecting means for detecting another of said wavelength multiplexed data; and
      means for transmitting data from a first node apparatus over the optical transmission to a second node apparatuses at a wavelength corresponding to a wavelength assigned to the second node apparatus when the second detecting means detects no transmission of data at the wavelength assigned to the second node apparatus during a time slot.

2. A system for transmitting data using wavelength division multiplexing, according to claim 1, wherein each of said node apparatuses further comprises:
   collision avoidance means for allowing data transmission in one of said time slots as programmed in advance, wherein only one of said node apparatuses transmits data in said one of said time slots.

3. A system for transmitting data using wavelength division multiplexing, according to claim 1, wherein:
   each of said node apparatuses, to which said wavelength division multiplexed data are transmitted, is allocated in a corresponding one of said time slots.

4. A system for transmitting data using wavelength division multiplexing, according to claim 1, wherein:
   said frame pulse includes a data presence signal representing a presence of data in wavelengths assigned to said node apparatuses.

5. A system for transmitting data using wavelength division multiplexing, according to claim 1, wherein:
   said optical transmission line comprises a first optical transmission line for propagating said wavelength division multiplexed data, and a second optical transmission line for propagating said frame pulse.

6. A system for transmitting data using wavelength division multiplexing, according to claim 1, wherein:
   said wavelength division multiplexed data are of predetermined wavelengths; and
   said frame pulse is of a wavelength different from each of said predetermined wavelengths.

7. A system for transmitting data using wavelength division multiplexing, according to claim 1, wherein:
   one of said node apparatuses, comprises:
      a first optical filter connected to said optical transmission line, and having a first output for providing a light signal of a wavelength corresponding to an address of said one of said node apparatuses and a second output for providing light signals of wavelengths corresponding to addresses of remaining node apparatuses of said node apparatuses;
      a first optical to electric converter having an input connected to said first output of said first optical filter;
      a first optical divider having an input connected to said second output of said first optical filter;
      a second optical filter having an input connected to said first output of said first optical divider for passing said frame pulse therethrough;
      a second optical to electric converter having an input connected to an output of said second optical filter;
      a second optical divider having an input connected to a second output of said first optical divider;
      an optical tunable wavelength filter having an input connected to a first output of said second optical divider;
      a third optical to electric converter having an input connected to output of said optical tunable wavelength filter;
      an optical delay line having an input connected to a second output of said second optical divider;
      an optical coupler having a first input connected to an output of said optical delay line;
      an electric to optical converter having an output connected to a second input of said optical coupler, an output light of a tunable wavelength being obtained at said output;
      a data interface circuit having first to third inputs and first to third outputs, said first input and said first output being connected to an external data processing apparatus, said second input being connected to an output of said first optical to electric converter, and said second output being connected to an input of said electric to optical converter; and a control unit having first input and output connected to said third input and output of said data interface circuit, second and third inputs connected to outputs of said second and third optical to electric converters, and second and third outputs connected to wavelength setting inputs of said optical tunable wavelength filter and said electric to optical converter; wherein:

said first optical to electric converter provides said data interface circuit with said data received in said one of said node apparatuses to be supplied to said external data processing apparatus;

said second and third optical to electric converters provide said control unit with said frame pulse and said data of a wavelength corresponding to an address of a node apparatus among said node apparatuses to be supplied with data from said one of said node apparatuses; and said control unit controls said optical tunable wavelength filter and said electric to optical converter, so that said optical tunable wavelength filter provides said third optical to electric converter with said data of said wavelength corresponding to said address of said node apparatus, and said electric to optical converter provides said optical coupler with a light signal based on data supplied from said external data processing apparatus, said light signal having a wavelength corresponding to said address.

8. A system for transmitting data using wavelength division multiplexing, according to claim 1, wherein:
said means for receiving data passes therethrough wavelength division multiplexed data of wavelengths not corresponding to the assigned wavelength of the node apparatus.

9. A system for transmitting data using wavelength division multiplexing, according to claim 8, wherein;
said means for receiving data converts only the wavelength division multiplexed data detected by the first detecting means from an optical signal to an electrical signal.

10. A method for transmitting data between a plurality of node apparatuses using wavelength division multiplexing during time slots defined by a frame pulse, wherein each node is assigned a unique wavelength that corresponds to a node address, and wherein a first node apparatus transmits data to a second node apparatus, comprising the steps of:

the first one of said node apparatuses checking whether or not data of a wavelength corresponding to the second one of said node apparatuses exists during said one of said time slots;

the first one of said node apparatuses generating data to be transmitted to the second one of said node apparatuses when a vacant one of said time slots is detected; and the first one of said node apparatuses transmitting data of said wavelength corresponding to said second one of said node apparatuses during said one of said time slots, when the first one of said node apparatuses detecting no data of said wavelength corresponding the second one of said node apparatuses.

11. A method for transmitting data between a plurality of node apparatuses using wavelength division multiplexing during time slots defined by a frame pulse which includes a data presence signal representing a presence of data in wavelengths assigned to said node apparatus, wherein each node is assigned a unique wavelength that corresponds to a node address, and wherein a first node apparatus transmits data to a second node apparatus, comprising the steps of:

the first one of said node apparatuses checking of said data presence signal to determine whether or not data of a wavelength corresponding to the second one of said node apparatuses exists during said one of said time slots;

the first one of said node apparatuses generating data to be transmitted to the second one of said node apparatuses when said data presence signal indicates that no data corresponding to said second one of said node apparatuses is being transmitted; and the first one of said node apparatuses transmitting data of said wavelength corresponding to said second one of said node apparatuses during said one of said time slots, when the first one of said node apparatuses detects a data presence signal indicating that no data corresponding to said second one of said node apparatuses is being transmitted.

* * * * *